(12) United States Patent
Staiger

(10) Patent No.: US 6,571,136 B1
(45) Date of Patent: May 27, 2003

(54) VIRTUAL NETWORK ADAPTER

(75) Inventor: Dieter E. Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/573,902

(22) Filed: May 18, 2000

(30) Foreign Application Priority Data

Jun. 19, 1999 (EP) .............................................. 99111824

(51) Int. Cl.⁷ .............................................. G05B 13/02
(52) U.S. Cl. .............................. 700/48; 700/19; 700/20; 700/47; 700/49; 709/224; 709/228; 709/235; 701/36; 701/48; 701/102; 701/115; 370/403; 370/410; 370/455; 370/465
(58) Field of Search .............................. 709/1–5, 17–19, 709/20, 46, 47, 48, 49–50, 83–86; 370/403, 453, 455, 458, 410, 445, 447, 462, 465; 340/825.5, 825.51; 701/1, 36, 48, 102, 114, 115, 29, 35

(56) References Cited

U.S. PATENT DOCUMENTS

| | | | | |
|---|---|---|---|---|
| 4,858,232 A | * | 8/1989 | Diaz et al. .................. | 370/465 |
| 5,471,461 A | * | 11/1995 | Engdahl et al. ............. | 370/252 |
| 5,499,374 A | * | 3/1996 | Di Giulio et al. ........... | 710/107 |
| 5,642,360 A | * | 6/1997 | Trainin ....................... | 370/229 |
| 5,978,578 A | * | 11/1999 | Azarya et al. ................. | 700/1 |
| 5,982,780 A | * | 11/1999 | Bohm et al. ................. | 370/450 |
| 5,996,025 A | * | 11/1999 | Day et al. .................... | 709/328 |
| 6,085,177 A | * | 7/2000 | Semple et al. ............... | 235/379 |
| 6,240,340 B1 | * | 5/2001 | Minowa et al. ................. | 701/1 |
| 6,252,881 B1 | * | 6/2001 | Samoylenko ............... | 370/433 |

* cited by examiner

Primary Examiner—Ramesh Patel
(74) Attorney, Agent, or Firm—John David Flynn

(57) ABSTRACT

A method and an electronic circuit arrangement is provided which allows observation of bus-systems and networks. In particular the method and circuit arrangement does not cause electrical or physical constraints and influence to the bus-systems and networks. Still more specifically it provides for accessing static bus-systems and networks in particular used by real-time constrained systems and applications such as in automotive vehicles.

10 Claims, 6 Drawing Sheets

VIRTUAL NETWORK ADAPTER

FIELD AND BACKGROUND OF THE INVENTION

The present invention relates to a method and an electronic circuit arrangement allowing observation of bus-systems and networks. In particular the invention relates to such a method and circuit arrangement not causing electrical or physical constraints and influence to the bus-systems and networks. Still more specifically the invention provides for accessing static bus-systems and networks in particular used by real-time constrained systems and applications.

Buses and networks, used to interconnect real-time electronic systems, are typically defined during system definition and design. The number of bus attachments (loads) and, depending on the type of network to be accessed, the message IDs are predefined during the system definition and can not be altered during system runtime.

Typical representatives for real-time busses are for example networks used in today's modern automobiles, like CAN (Controller Area Network), VAN (Vehicle Area Network), J1939 (specified by SAE, Society of Automotive Engineers) and others. The bus type, topology and the bus-participants are defined by the automotive manufacturer. For several reasons, it is not possible to add on additional devices or units to these busses after the vehicle left the manufacturing plant:

a) The most important factor is safety. Typically providing access to all major Electronic Control Units (ECUs) within the vehicle, safety relevant devices like brake control, engine management and others are connected to the real-time bus-systems;

b) The real-time bus-systems typically provide a limited amount of electrical drive capability, thus limiting the number of devices supported within one network.

c) The number of bus participants and accompanying addresses/message-IDs are kept to a minimum to allow to achieve cost effective systems.

As a consequence to the facts as explained, the busses are not 'open to public', thus do not allow adding on new devices at a later time. Only by following this ground rule, the original manufactures will guarantee the vehicle operation to specifications, and most important, are liable to all safety relevant functions.

At present, this circumstance is a strong constraint to the further development of new after-market devices. Restricted by the status of bus access capabilities, these after-market devices are typically not supporting advanced applications demanding access to the vehicle real-time buses and networks.

Typical product examples are today's after-market entertainment systems, navigation systems and telematics devices.

Nevertheless, new emerging applications like on-line services (entertainment, traffic information, etc.), real-time remote diagnostics, advanced 'dynamic' navigation systems and others are requiring access to data provided by the diverse vehicle sub-systems (wheel sensors, giro, speed, steering angle).

Due to the limiting facts as explained, this type of new services can only be offered by the original manufactures, provided as an OEM device, developed in cooperation with the vehicle developers.

Unless add-on-device bus access capability is not explicitly provided and built in by the vehicle manufacturer, after market devices are not supported and cannot be allowed to be added to the vehicle domain networks in a 'plug and play' manner—an important security issue with potential legal consequences if ignored.

SUMMARY OF THE INVENTION

It is therefore an purpose of the invention to provide access to non-public, restricted networks as typically used in automobiles without the above mentioned shortcomings.

It is a further purpose of the present invention to provide a method having the most important features of the typical bus access methods, as known by standard network adapters.

The present invention describes a principle for an electronic control system providing access capability to protected networks and bus-systems for application processor units, especially used in an automotive vehicle. The active network access tool, in the following called Virtual Network Adapter (VNA) is exercised in a unique virtual manner, in real, the VNA network access is performing absolutely passively, thus not influencing the network neither logically nor physically, in particular there is no electrical influence.

Like standard bus-adapters/controllers, the VNA is featuring two access ports connecting to the external electronic systems. The primary side is accessing the protected real-time network in focus, while the secondary access port of the VNA is interfacing to the Controller System or ECU to be connected to the network.

As is known in the prior art, devices hooked up via standard bus controllers are actively writing to vehicle real-time networks. As for example the message 'get oil temperature' will invoke a write command issued to the protected network, requesting the specified information from a specific vehicle domain ECU. Given this typical procedure, as normally executed by standard bus-controllers, therefore, the major requirement of not influencing the network cannot be fulfilled.

It is an advantage of the present invention that, although in reality not actively acting on the real-time network, the VNA system is supporting the major bus access functions like Data/message on request—invoked by external calling unit ('active bus access mode')

Data/message provision on polling—invoked by external calling unit ('active bus access mode')

Data/message broadcast—VNA system initiated ('passive bus access mode')

The method proposed by the VNA principle is intended to provide access to the messages present at a given time to the most commonly used real-time bus systems. In order not to influence the existing (predefined) network for any reason, neither logically nor physically, standard bus controllers, using the typical arbitration and bus access procedures cannot be used.

As a consequence, not being able to arbitrate and to logically interfere with the respective bus participants, thus not being able to 'request' required data on demand, in the 'first thought' leads to the conclusion, not providing the network access appropriate to the applications in mind.

The following important statement will provide the elementary precondition for the applicability of the VNA principle:

Each ECU, attached to a real-time network, will provide data and unit relevant information at the bus-system at a certain point of time. As a reversal conclusion: This fact not being the case would dispose the right for this unit to exist on the bus in the first place. In other words, each unit attached to the network will be providing data to the net, invoked on request by other units (regardless of technique, pooling or event triggered), or self-initiated, as for example triggered by an integrated sensor or any other internal logical event.

In any instance, the data providing messages will be issued and exposed to the network initiated by meaningful events and in adequate incidence.

Exactly this fact is the point of admission for the applicability of the proposed VNA system—and in differentiation to feasibility, any network not showing to this basic attribute and behavior will not be meaningfully supported by the VNA.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(s)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The idea of the VNA is to take leverage of the prior explained conditions and constellation. Using a bus monitor method, not influencing the network (insignificant surge of energy), the VNA will acquire all messages present at the network. The internal processes are designed to identify the messages and to apply programmable filtering algorithms, thus reducing the amount of data and messages, in focus by the requesting application. As a final result, the drastically reduced data/message-stream can be either broadcasted, or being provided to the requesting unit on demand.

Figure 1:
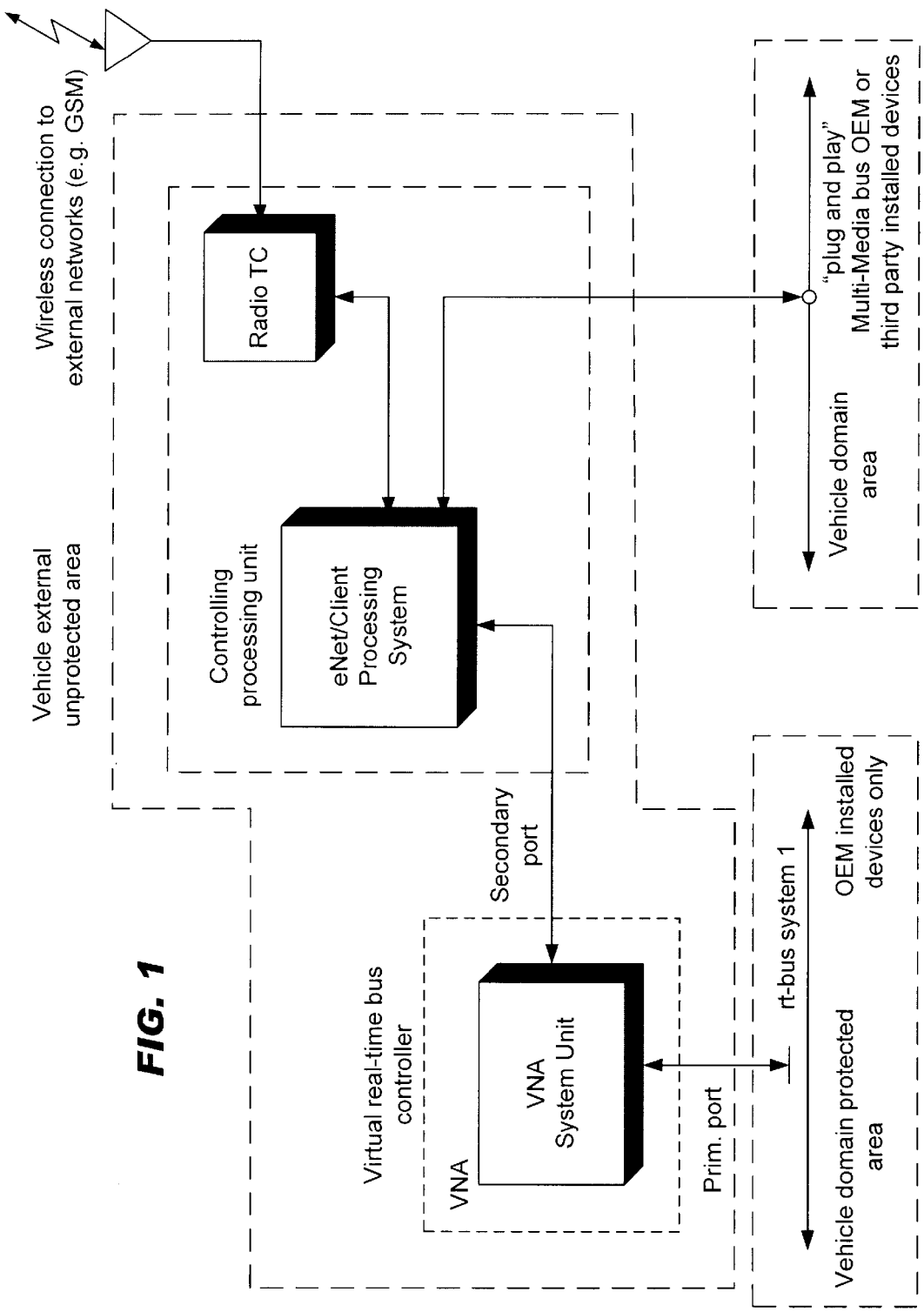
FIG. 1 shows a Network/Client application processing unit, supported by the VNA according to the invention.

The example shown in FIG. 1 illustrates a simple Network/Client Application System. On the primary access port, the VNA is connected to the vehicle domain protected area by accessing a real-time-bus system. In this example, the VNA is supporting an 'eNet/Client processing System', hooked up on the secondary VNA access side. A radio transceiver device (radio TC) connected to this processing system is providing the vehicle external access capability via wireless link, thus allowing the wide range of e-business applications enabled by network servers and providers. The applications performed by the eNet/Client processor are taking leverage of the VNA controller, by gaining access to the vehicle domain data provided by the vehicle internal real-time bus.

The VNA controller is gathering the data and messages 'invisible' to the network and bus-participants and further more, is providing the 'pre-computed' messages and data information to the vehicle internal and external Network/Client units.

Since the Network/Client units are enabled to connect into vehicle external networks (i.e. Internet), these ECUs are potentially exercising applications in an 'unprotected' area. As outlined before, this fact is representing a critical risk to the vehicle safety relevant operations, performed by the units connected to the vehicle real-time networks on the other end.

In strong consideration according the VNA claim—not influencing the safety relevant vehicle domain network(s) in any manner—the specific nature of the VNA is intended to guarantee absolute safe operation under all operating conditions.

As a consequence to this strict ground rule, the VNA is not enabled to actively write to, or to stimulate or manipulate the safety critical vehicle network in any other way. However, in order to support the typical functions as provided by standard bus adapters, the VNA is featuring a unique solution bringing both requirements in line—supporting standard bus adapter modes—while guaranteeing safety of operation.

The key idea for the VNA is to provide the active bus adapter functionality in an 'indirect' way—thus fulfilling the vehicle domain bus access commands 'virtually'.

The VNA processor is continuously monitoring and gathering all messages presented to the vehicle domain network. This 'background operation' is ongoing exercised by the VNA independent from the controlling ECU units hooked up to the secondary VNA-port and regardless of commands and requests issued by these ECUs. Controlled by the VNA internal specific program (VNA micro code/firmware), the messages are filtered, analyzed and categorized. The motive in mind for this operation is to identify exactly those messages and data information which will potentially get requested (at a certain point of time) by the applications performed by the controlling ECU units. If considered to be a 'request type message', the respectively gathered data will be stored in the VNA internal data/message repository. The 'request type messages' are identified and pre-defined during the specification and design of the specific VNA/ECU-application-system and will be permanently stored in the VNA internal program storage.

In direct relation to the operation of standard bus adapters, these messages are inclosing all message-IDs issued by the application ECU(s), in Prior Art systems normally actively writing requests for specific data information to the vehicle domain network (e.g. 'get steering angle'). As explained, the VNA is gathering and collecting this specific type of data continuously—although no requests for messages are received from the appended ECUs at the moment of time.

Depending on the overall system requirements, the VNA controller can append a 'time-stamp'—provided by the internal Real-Time-Clock (RTC)—to the respective datafield of the message to be processed. A further duty of the VNA controller is to maintain (keep/skip previous messages) the message data repository, thus being capable to provide the most actual data/messages at any given time.

Thus, again relating to the operation of standard bus adapters, rather than accessing the network in reality, the VNA will serve the ECUs actively requesting data from units located at the vehicle domain network, by simply retrieving the data/message stored in the VNA data repository—pre-gathered by the continuous VNA monitor process. This deception, simulating an active vehicle bus access, will not be recognized by the calling application ECU unit, and the data delivery will appear like a real-time network access to the requester.

For additional operational modes, the VNA could be enabled to broadcast selected real-time data, predefined by the application program (e.g., vehicle speed, engine temperature, and others) via the secondary VNA access port to all ECUs hooked up to the secondary bus-link. Provided these 'vehicle internals', the example system shown in FIG. 1 is enabled and prepared to provide a whole new spectrum of applications. In combination with a wireless link connecting into vehicle remote networks (e.g., GSM, Internet), the example 'Network/Client Processing Unit' is empowered to support compelling functions like remote on-line diagnostics, remote electronic maintenance, dynamic navigation, emergency call, advanced vehicle control—and many others.

In the present automotive market situation, all of these applications are provided only by OEM systems, originally ordered and built in the vehicle at productions time. Most common, these functions are typically cost intensive 'extras', only offered for high end vehicles classes. The VNA is supporting the major bus/network access functions as known by standard bus adapters. There is no difference in operational mode, bus access methods and offered functionality for a controlling unit connected to the VNA—the VNA appears to operate like a standard bus adapter.

As opposed to standard bus adapters, the active network access is exercised in a virtual manner. The network is virtually accessed by menas of providing a typical active network access on request of secondary port connected ECUs. For example, an ECU is writing the command "get oil temperature" via the (VNA) bus-adapert "actively" to the network—this command is representing a message request, addressing a specific ECU located on the real-time network. In reality, the VNA will perform an internal message retrieval process, searching the VNA internal storage for the requested data. The VNA internal storage is containing data/messages continuously pre-gathered by the VNA (regardless if requested or not). Finally providing the requested information to the ECU, this overall process will appear to the requesting ECU like a standard 'active bus access'—even though not provoking any connection and activity on the network.

Summarizing the real action, the VNA network access is performing absolute passively, thus influencing the network neither logically nor physically. This attribute is representing the key advantage of the VNA principle, thus allowing to access of 'non-public', safety constrained networks. In particular, the VNA is providing access to the internal 'protected' real-time networks of modern automobiles—guaranteeing uninfluenced safety of operation for all vehicle domain functions—regardless of the applications, number and types of application processing units connected to the secondary side of the VNA.

In differentiation to standard bus adapters, the VNA is not exploiting the arbitration techniques as prescribed by the respective networks in focus. As a beneficial consequence, it is a further attribute of the VNA to support various vehicle internal 'protected' real-time networks, regardless of protocol standard and network-bandwidth. Only a single VNA instance is required to access the respective (individual) networks simultaneously. A conciliatory gateway controller, concentrating all necessary information on a single, still protected network, is not required.

Not being restricted by the constraints as described for the standard bus adapters of prior art, the VNA will allow the vehicle manufactures as well as the supplier companies to develop new types of compelling products featuring new, advanced applications and service offerings.

The principle of the proposed system and the internal structure as described predestinates a typical VNA realization to additionally implement complementing functions within the VNA unit—leading to further advantages for the overall-system in focus.

The most beneficial functional extensions are covered by three topics, namely (1) Message pre-processing (2) Secondary network-port (3) Specific data gathering Explanation of Function (1)

Beyond providing the typical bus-adapter functionality, a VNA implementation connected to all real-time networks of a vehicle is the predestined element to provide additional advanced message monitor and message pre-processing functions:

a) Data reduction functionality (ID and/or data content dependant, frequency or quantitative filtering), b) Data repository (including repository data management), c) Intelligent data broadcasting (defined to quantity and/or time-window and/or qualitative filtering), and d) Generate 'newly defined messages'—combining/calculating data using program predefined selective messages.

As opposed to state of the art bus adapters, due to its internal architecture, the VNA is predestinated to support this additional functionality, while maintaining very little cost adders to the system. Advanced standard bus adapters as available on the market are enabled to exercise very limited message-ID filter functions. The extended functions described for a) to d) would have to be provided by additional software modules performed by the attached application CPU. Due to dramatic increase on demand of performance induced by this routines, the implementation is typically restricted to an applicable minimum—still encountering significant cost increase for the system.

Description of Functions a) to d)

The data volume gathered by a VNA connected to multiple (all) vehicle domain busses, can sum up to a high data volume, and as a second consequence, will generate a very high interrupt rate issued to the ECUs connected to the VNA secondary side. Both effects will potentially lead to an extended volume of electronics, physical size and power consumption, finally leading to a significant increase in cost for the overall system.

The data volume in terms of storage space can typically be provided by the respective ECU(s). However, the data management will encounter a processor workload not to neglect and may enforce to choose a more powerful processor(s) for the respective application ECU(s).

The interrupt rate generated by a VNA connected to, i.e. four CAN real-time networks, can easily reach a rate of more than 15.000 interrupts/s. Depending on the interrupt latency and the time required for the interrupt-handler execution, even powerful 32-bit processors can be loaded to a very high degree—thus dramatically limiting the performance left for the actual application(s) to be performed by the respective ECU. Again as a consequence, this fact would lead to a drastic increase on demand for speed and performance for the processor, processor support- and storage-devices, used by the respective application ECUs.

For both reasons as explained, the message computing capability as indicated by the functions a) to d) can represent a significant advantage for an overall system implementation. The VNA internal processing electronics performing the VNA process steps 3 to 6 is preferable realized by an sequence controller—a dedicated state machine—designed to best fit the specific VNA requirements. If the design effort is a concern, and if slightly higher VNA-cost are acceptable, a standard micro controller or a digital signal processor can be used to perform this process steps as well. In any occasion, due to the internal structure of the VNA, these additional features can be implemented within the VNA unit, causing only very low overhead on the hardware side for the VNA unit. The benefit for the overall system will pay in a drastic reduction on the demand for computing performance for the controlling ECUs, thus allowing a very effective operation of the applications to be served.

Explanation of Function (2)

Standard bus-adapters are typically equipped with an 8-bit parallel access port. For a standard implementation, this type of port can be identically provided by the VNA. Nevertheless, the nature of the VNA principle—being able to adapt to a plurality of (potentially different) networks simultaneously—is suggesting to support a plurality application ECUs connected to the secondary VNA port as well.

As a simple solution, any bus-system can be implemented to serve as secondary port. Using accepted bus-standards will allow to support and to hook up OEM devices as well as various third-party installed after-market systems. The number of supported add-on devices is not limited by any VNA principal oriented theoretical argument.

Figure 2:
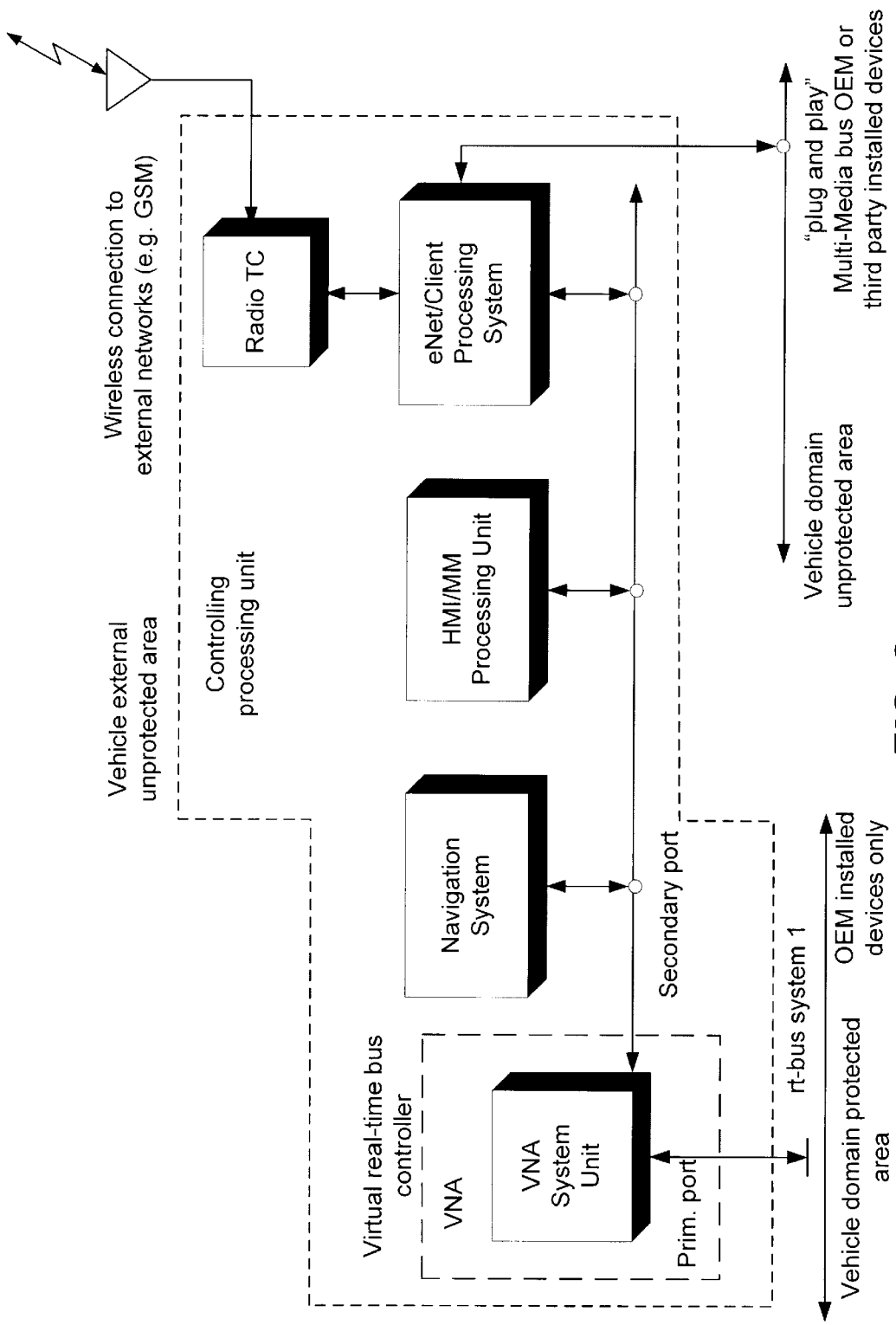
FIG. 2 shows a secondary port network as a VNA extension according to the invention.

The example shown in FIG. 2 illustrates a Network/Client Application System. On the primary access port, the VNA is connected to the vehicle domain protected area by accessing a real-time-bus system. In this example, the VNA is supporting a 'Network/Client Application System', consisting of three typical devices hooked up on the secondary VNA access side. The first system is represented by an Navigation System, the second ECU is featuring Human-Machine Interface (HMI) and Multi-Media (MM) processing capability, and the third unit is providing the vehicle external access capability via wireless link, thus allowing the wide range of e-business applications enabled by network servers and providers. Each one of the attached ECUs is taking leverage of the VNA controller, by gaining access to the vehicle domain data provided by the vehicle internal real-time bus.

Figure 6:
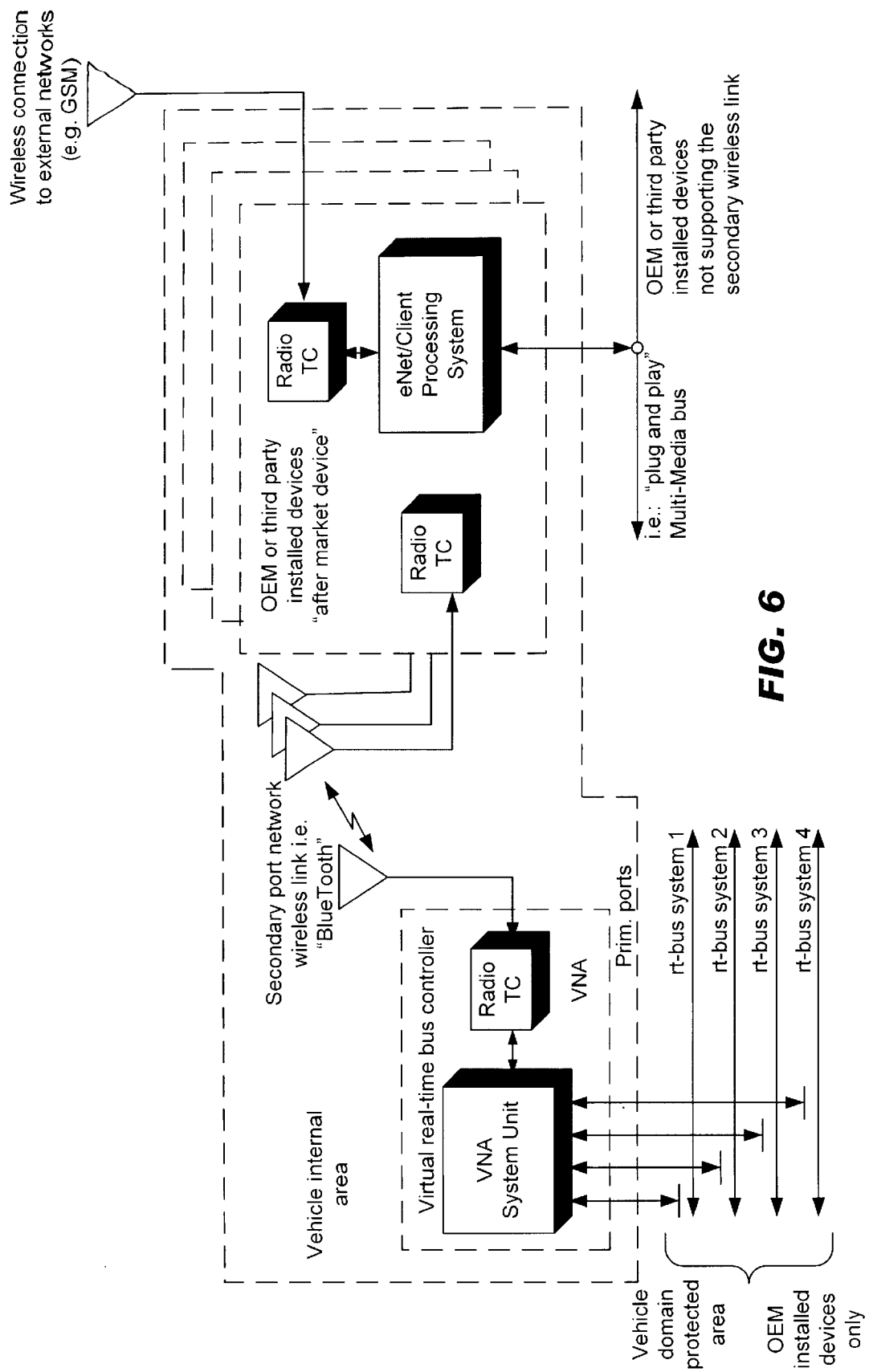
FIG. 6 shows an example for an eNet/Client processing system according to the invention.

Rather than using a standard wired busing scheme, a radio-link-network can present a compelling solution for the secondary port realization. An example utilizing a wireless network for the VNA system is explained below. The illustration shown in FIG. 6 is supporting the communication with multiple units located within a small distance field—as typically given in automobiles. In this specific realization, the VNA can be accommodated in any appropriate physical location within the vehicle, not requiring any wiring harness connecting to the distributed application ECUs. Typically, this fact can be a tremendous advantage for supporting and enabling retrofit and after-market devices.

Explanation of Function (3)

Identically to the functionality as provided by standard bus-adapters, the primary task of the VNA is to adapt to and to access the specific network(s). Representing the central access point providing requested data and messages to the respective application processing units connected to the VNA secondary port, it is obvious to further extend the information service capability of the VNA.

For this reason, a VNA implementation utilizing the functional extension (1) and (2) as described, predestinates the VNA to be the ideal information partner to provide additional data services, reaching beyond data gathering capabilities as provided by the vehicle network access. Even in modern automobiles, but for sure in older vehicles, or as well as most typically for lower cost vehicles, not all wanted and/or relevant parameters required by the application processing units are available and presented on the vehicles domain networks. The specific parameters can be provided by OEM parts originally built in the vehicle, or can be generated by retrofit/after-market devices.

Examples for this type of service elements and provided parameters are

Vehicle outside temperature sensor

Distance sensors, e.g., used by parking-aid applications

Rain-detectors, e.g., to automatically switch on the windscreen wipers or to close the sunroof Alarm sensors RDS/TMC data (Radio-Data-System/Traffic-Message-Channel)

GPS (Global positioning System)—positional coordinates data

RTC (Real Time Clock)—providing time and date, e.g., by radio link service

Daylight sensors

Figure 3:
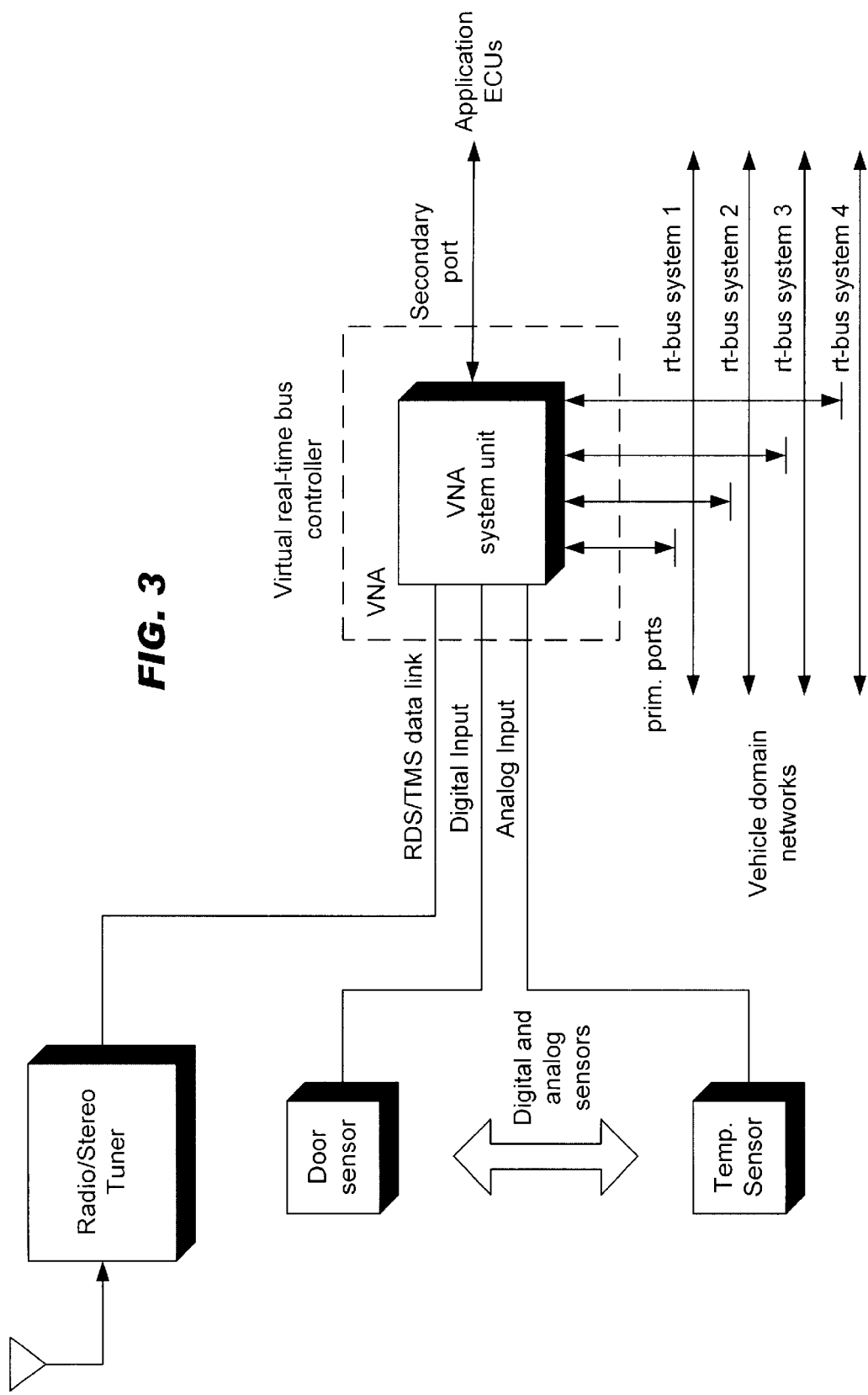
FIG. 3 depicts a functional VNA extension according to the invention.

Being in particular valid for complex overall systems, it is meaningful to add on this additional parameter capturing features and specific devices interfaces to the VNA. FIG. 3 illustrates an example for a typical hardware implementation, featuring functional extensions. In extended capability as opposed to the basic bus-adapter function, the VNA is tied to four individual real-time bus systems, allowing to gather all vehicle domain data presented to these networks on VNA the primary access side.

Examples for potential extending information gathering and data acquisition services are (a) The RDS/TMC data link is connecting to the vehicle stereo radio, providing the traffic information and data services offered by these broadcasting services. This or other add-on sub-systems (i.e. GPS units), typically interface by standard serial links, such as i.e. RS232, (b) Digital data input capture:
Typically supported by digital ports connecting, e.g., to the vehicle door switches, trunk switches, or others, (c) Analog input capture:
Typically implemented by ADCs (Analog Digital Converters) to be provided by the VNA. Sensors like temperature elements or liquid level indicators are typically representing this type of elements.

All application ECUs connected to the VNA secondary port are enabled to request and to utilize this additional information allowing for more advanced applications to be performed by the overall system.

Representatives for advanced applications are

Advanced 'dynamic' navigation, using RDS/TMS and information provided by vehicle internal sensors, Theft prevention using GPS, GSM together with data provided by digital and analog sensors These two examples are meant to open the view for potential enhanced or new compelling applications.

In the following, the VNA principle will be described in more detail.

The VNA unit is in general featuring two access ports. On the primary access side, the VNA is connected to the respective bus-system in focus to be adapted to. The secondary port provides the interfaces to the processing unit to be adapted to the network. To this extend, these attributes are identical to the bus-adapters/controllers as known in the prior art.

A first differentiation can be made by the VNA principle enabled functional extensions, going beyond the capabilities of standard bus-adapters/controllers.

(a) The primary side can be implemented to support a multiple of network access ports—provided by a single VNA instantiation, (b) The networks supported on the primary side may feature individual and different protocols, arbitration schemes and data formats—provided and executed by a single VNA instantiation.

(c) As a consequence to the multiple network access capability on the primary side, it is a potential benefit of the VNA principle to support a bus-structure for the secondary access port as well.

Figure 4:
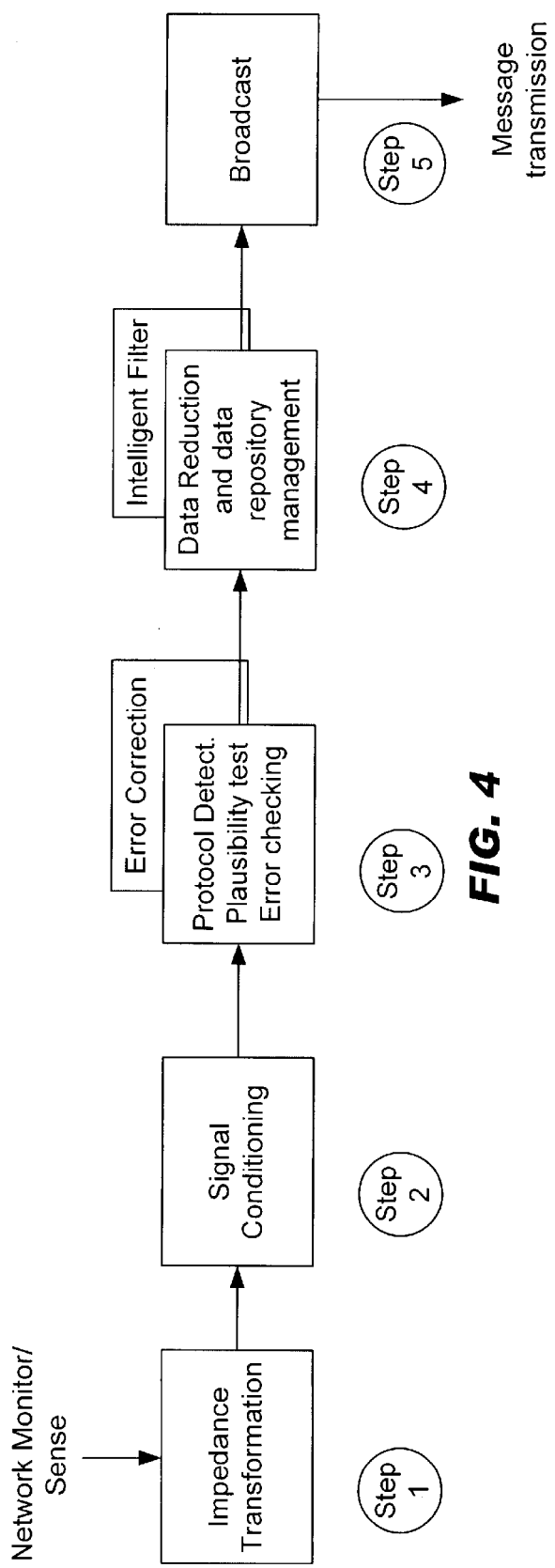
FIG. 4 shows the VNA process steps according to the invention.

The realization of the internal operation for the VNA method is described in FIG. 4 by a process sequence exercising five VNA process steps:

The VNA is adapting to vehicle network(s) using non-influencing electronic sense/measurement methods, e.g., capacitive coupling, inductive coupling, electromagnetic field sensing, etc., (d) Signal conditioning using a two phased execution:
  Phase 1—analog signal conditioning employing high pass filtering and level clipping.
  Phase 2—digital processing using acquisition method best described with high frequent transition scanning, (e) Message identification (identify protocol type, identify type of message); verify data integrity, (f) Data reduction using intelligent filtering: ID filter (specific and range), message occurrence (time window and frequency filter).
  Message repository storage management, allowing to operate in a bus adapter mode in accordance to 'message on request'.

(g) Data/message provision by:
  Message on demand/request; message on polling; message broadcast Process steps 1 to 5 are processed in a sequential order. A detailed description outlining the specific operations is provided in the following.

In the first process step, the VNA is accessing and gathering the digital information of the real-time network in consideration. According to the ground-rules of the VNA principle, the adaptation to the real-time bus is to be performed in a way not causing influence to the network in recognizable significance.

In general it can be distinguished by two principally different access/contact methods:

1) Contactless sense techniques like:
  a. capacitive coupling,
  b. inductive coupling, and
  c. electromagnetic field sensing 2) Contacted, very low current probing sense like high input impedance amplifiers (impedance transformation).

It is advantageous to incorporate an 'initial' band-path filter in the step 1 electronics, allowing to segregate environmental electrical noise—a basic coarse filtering of the digital data to be captured. The network type and going along bus-protocol specification is not of relevance at this process stage.

The access/contact method described in 2) is providing a very cost-effective electronic realization for the process step 2, adequate for the majority of VNA implementations and will therefore be used as an example.

Figure 5:
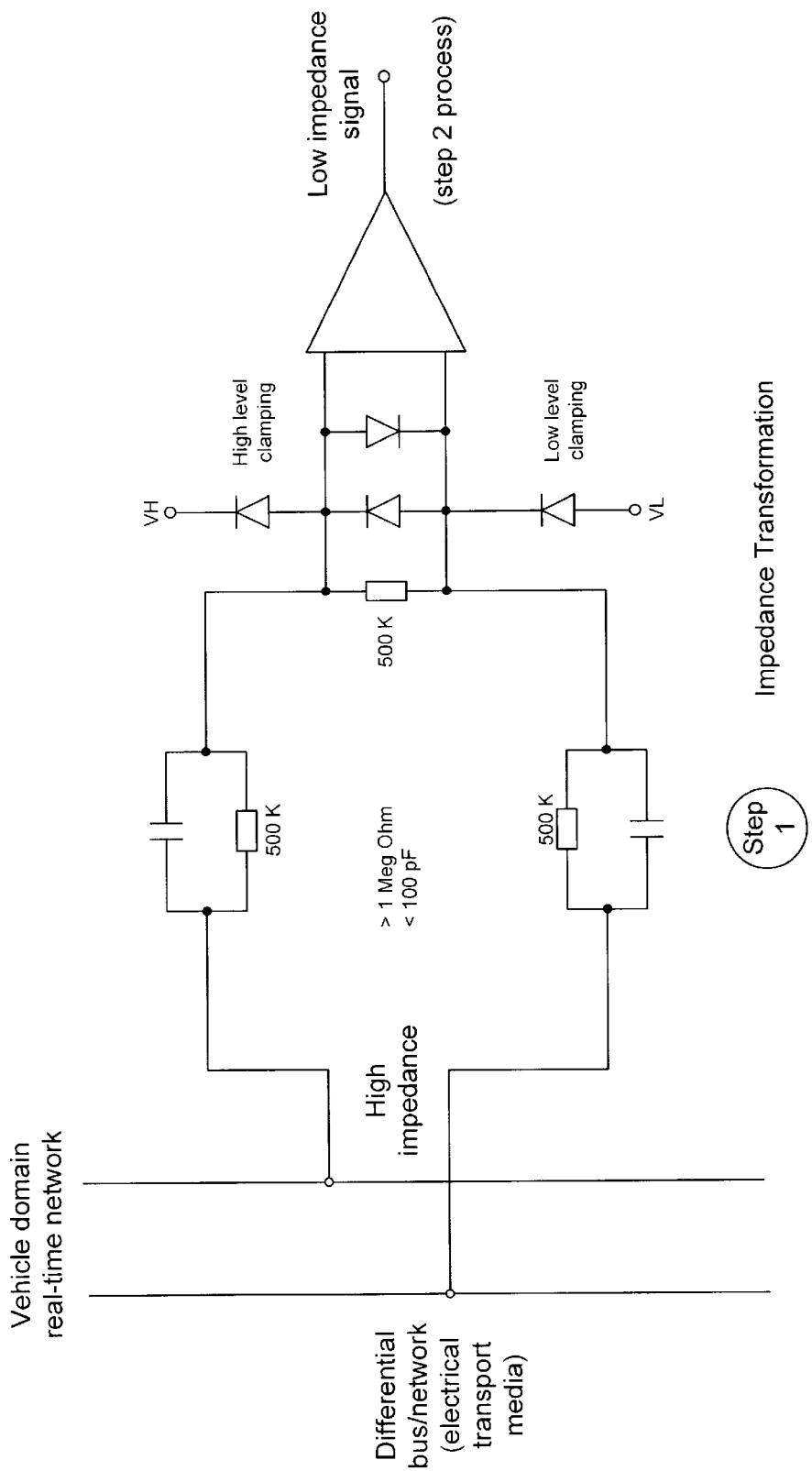
FIG. 5 depicts an example for a high impedance unidirectional physival layer according to the invention.

FIG. 5 illustrates a high impedance amplifier to be used as a primary VNA access port, monitoring the protected network in focus. The network example for this physical adapter implementation is using a 2-wire differential electrical transport media.

Typical representatives for this type of real-time network, widespread implemented in modern automotive vehicles, are the CAN bus-system and VAN bus-system, most commonly used in Europe, and for example the SAE J1939 used in vehicles build by American automotive manufactures.

The circuit shown in FIG. 5 is using a standard differential amplifier functioning as an impedance transformer. The primary side of the amplifier circuit is providing a high electrical impedance, thus guaranteeing a minimum influence and electrically loading for the vehicle domain network. The energy taken from the network by this 'electrically contacting' bus-adapter solution is designed to keep the primary energy balance at an insignificant value for the respective overall network specification.

The amplifier is operating in unidirectional mode, not permitting any active action influencing the protected network.

The signal provided at the output can be used for the further processing of the signals monitored by the input. The input is protected by anti-parallel diodes as well as clamping diodes connected to the high and low voltage of the system.

Depending on the development and the dimensioning of the clamping circuits, this feature can already be part of the signal conditioning—part of the process step 2.

The practical realization can be an adapter plugged in between the standard connector of any ECU-device (a method as for example known by typical 'dongle' devices inserted to the printer connector of a Personal Computer)

In the second VNA process, the captured data is restored to plausible digital data—with respect to the data rates and pulse width—as well as the signal voltage levels potentially expected by the system in focus.

In realization, standard techniques and methods can be used:
  a) Up- and down-level clamping (voltage clipping),
  b) Band-path filtering (analog or digital techniques), and
  c) Specific glitch (noise) filtering circuits (analog or digital techniques)

Validated in this manner, the acquired digital signals can be restored to appropriate timing relations by using the respective real-time network specific oversampling frequencies, appropriate to the data rates expected.

The third process step is used to identify the real-time bus protocol(s) and will detect the type of message. At this point, it is meaningful to exercise the protocol specific error checking and message plausibility tests as well.

Specified by the system requirements, a VNA implementation is most commonly utilizing an internal processing engine. Typically this VNA internal processing engine is performing this process effort (and most likely the VNA process steps 4 and 5 as well).

The basic routine performing the VNA process step 3 is comparing the gathered data pattern with the typical real-time bus protocol parameters provided by the specific VNA configuration (pre-stored in configuration registers). Further micro-program routines will test for message plausibility and data integrity. Thus identifying the message protocol and message type, further micro-program routines will perform the respective bus specific error checking (and/or error recovery).

If the bus type and the protocol is known, or as the case may be, predefined, this process step can be simplified significantly.

Due to the nature of the VNA system, gathering virtually all information traveling on the examined real-time network, a proverbial flood of data-messages will potentially be generated. It is therefore a major task for the step 4 process to strip down the obtained data-messages to the amount and types of messages potentially in focus of the VNA assigned ECU (typical after-market unit e.g. MMI/MM system).

The message filtering is typically performed by an dedicated micro-processor (a signal processor or a specific filtering processor device).

Beyond this performance, this processor can perform intelligent message-filtering operations like:
 a) Quantitative filtering,
 b) Time constrained filtering (time window, point of time),
 c) Data content filtering, or
 d) Supplementing message by time stamp data.

The 'finally' valid data will be stored in a data repository (message buffer). It is a further duty of the message filter controller to maintain the message buffer, like clearing 'obsolete' messages or duplicate information—or priority messages.

Process step 5 is representing the bus-controller interface competency. Building the 'secondary access port' of the VNA providing the connectivity to the vehicle internal and external electronic control units.

Prior art bus adapters typically provide an 8-bit parallel interface (or in some instances a standard serial port) allowing to connect to the respective control unit.

In differentiation, the VNA secondary interface port is preferably implemented by an standard bus system, allowing to support a multiple of system internal and external ECUs. Regardless of the specific realization, the secondary VNA port will support at least all known functions as provided by state of the art bus-adapters.

In accordance to this requirement, supporting all major standard bus-adapter access methods, the messages will be processed and provided according to the typical data/message retrieval types, namely:
 a) message on request,
 b) message on polling, or
 c) message broadcast.

Types a) and b) are initiated by the connected ECUs actively (e.g., the navigation system, the HMI/IMM processing unit or the eNet/Client system—shown in FIG. 2).

In other words, the eClient-ECU, in this type of operation, is 'writing' a calling message to the real-time bus controller (VNA), thus requesting data from a specific device known to be present on the real-time bus. For example, this correspondence could be: 'provide oil temperature'—expecting an answer message delivering the value for the actual oil-temperature.

However, as explained earlier, this request-write operation will not be performed in reality, since the VNA ground rule does not allow to influence the real-time bus in any active manner.

Furthermore, this request-write operation will be executed 'virtually'—triggered by the request, the VNA processor will invoke a seek operation finally retrieving the requested data information from the message buffer containing the 'pre-gathered' message information.

The internal VNA process is not recognized by the calling ECU. For the calling ECU, this operation appears to be exactly identical to an active real-time bus access—as typically performed by a standard bus controller and going along physical layer device.

The message broadcast c) is initiated by the VNA controller. The eClient-ECU will be interrupted and is provided the broadcast message. Most likely, the broadcast messages will take leverage of the VNA filtering capabilities, thus keeping the eClient-ECU interrupt rate at a moderate frequency.

The VNA process step 5 can be performed by a dedicated low performance controller, however, for the majority of implementations, the processor performing the step 4 operation can cover this activity.

VNA is providing real-time bus access, supporting third-party installed 'after market devices' as well as OEM devices to access and to use real-time system internal data gathered by the vehicle domain networks. This will open a new field of applications and services, today only provided by OEM equipment, installed by the original manufacturer.

The key advantages of the presented principle are:
 Provide access to 'protected' bus-systems and networks, supporting the most common bus-controller modes—'Virtual active/write message request',
 No logical influence to the network and/or participants—'Invisible network access',
 No significant electrically loading or influence to network,
 No significant physical constraints to network,
 Data/Message reduction by message pre-selection and filtering,
 Network protocol independent bus-monitoring, and
 Cost advantage to standard bus adapter access.

Typical applications of the present invention are:
 Network monitor supporting OEM devices as well as third party installed 'after-market' devices to access real-time networks,
 Advanced and new applications and services like:
  Telematic services (i.e. emergency call, automatic accident report . . . ),
  Dynamic Navigation,
  Multimedia services,
  Remote diagnostics service,
  Remote maintenance,
  Theft prevention, purloin vehicle location,
  New vehicle external network supported services and applications,
  Vehicle domain network monitor, test and diagnostics,
  Monitor and diagnostics for network participants, and
  Broadcast system for vehicle internal and external messages In the drawings and specifications there has been set forth a preferred embodiment of the invention and, although specific terms are used, the description thus given uses terminology in a generic and descriptive sense only and not for purposes of limitation.

What is claimed is:
1. Apparatus comprising:
 a vehicle;
 a plurality of vehicle domain electronic control units within said vehicle coupled via a protected vehicle domain network;

a client processing system having one or more electronic control units coupled via an unprotected vehicle domain network;

a virtual network adapter having a first interface to the protected vehicle domain network, and a second interface to the unprotected vehicle domain network, the first interface permitting the virtual network adapter to passively receive messages from the protected vehicle domain network using a non-influencing electronic sense device, the second interface permitting the virtual network adapter to receive and send messages to the unprotected vehicle network domain; and, a virtual network adapter processor for continuously receiving messages from the protected vehicle domain network via the first interface, the virtual network adapter processor forming a data repository using the continuously received messages, the virtual network adapter processor providing the client processing system access to the data repository via the second interface whereby the client processing system can access information provided by the vehicle domain electronic control units.

2. Apparatus according to claim 1 wherein said virtual network adapter processor provides the client processing system with access to the data repository by simulating standard bus access functions.

3. Apparatus of claim 1 wherein the first interface receives messages from the protected vehicle domain network using a contactless sense technique.

4. Apparatus of claim 1 wherein the first interface receives messages from the protected vehicle domain network using an impedance transformer.

5. A method comprising the steps of:

monitoring a plurality of automotive electronic control units coupled together by a protected domain vehicle network in an automotive vehicle by receiving messages from the protected domain vehicle network using a non-influencing electronic sense technique;

storing in a data repository messages representative of the monitored automotive electronic control units; and providing a client processing system with access to the data repository via an unprotected domain network.

6. A method according to claim 5 wherein the step of storing in the data repository further comprises compressing messages.

7. A method according to claim 5 wherein the step of monitoring is carried out by direct electrical contact with the protected vehicle domain network.

8. A method according to claim 5 wherein the step of monitoring is carried out while avoiding direct physical contact with the protected vehicle domain network.

9. A method according to claim 5 wherein the steps of monitoring, storing and accessing are carried out by electronic circuits.

10. The method according to claim 5 wherein access to the data respository is provided by simulating standard bus access functions.

* * * * *